No. 617,900. Patented Jan. 17, 1899.
G. C. O. LANGE.
PHOTOGRAPHIC SHUTTER.
(Application filed Dec. 18, 1897.)
(No Model.)
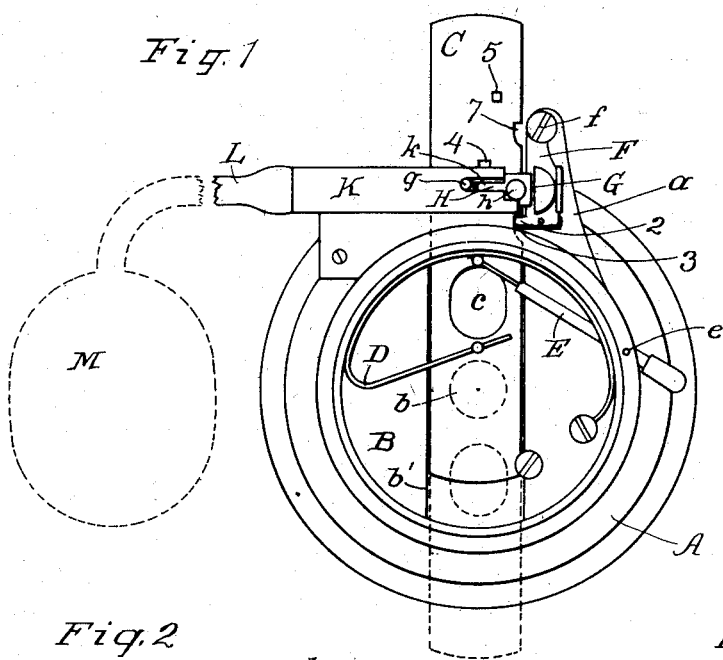
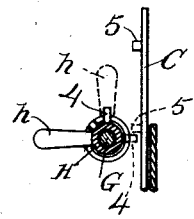
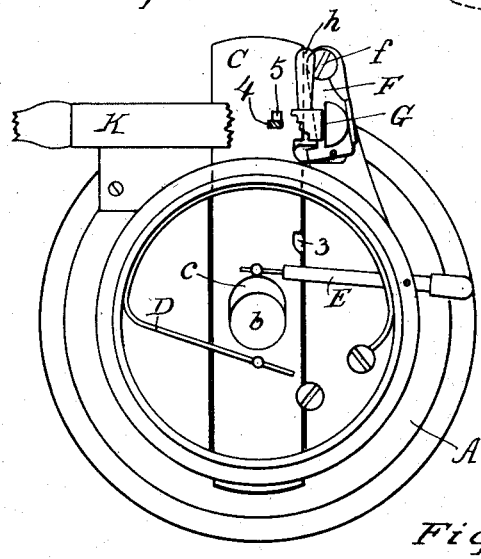
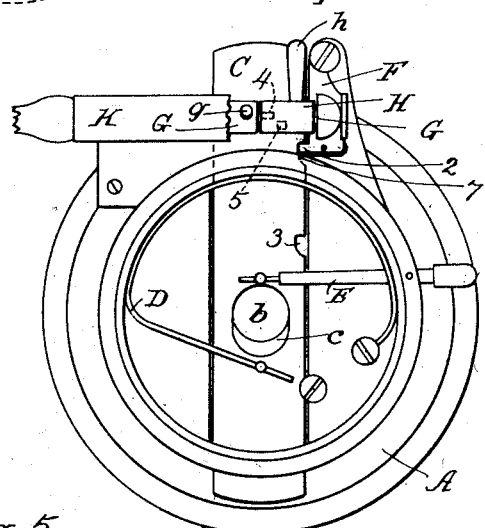
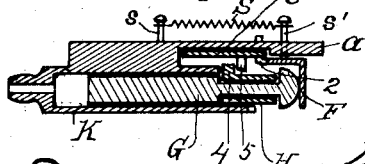
WITNESSES:
INVENTOR
George C. O. Lange
BY
ATTORNEY

UNITED STATES PATENT OFFICE.

GEORGE C. O. LANGE, OF CRESSKILL, NEW JERSEY, ASSIGNOR TO THE MANHATTAN OPTICAL COMPANY, OF NEW YORK, N. Y.

PHOTOGRAPHIC SHUTTER.

SPECIFICATION forming part of Letters Patent No. 617,900, dated January 17, 1899.

Application filed December 18, 1897. Serial No. 662,503. (No model.)

*To all whom it may concern:*

Be it known that I, GEORGE C. O. LANGE, a citizen of the United States, residing at Cresskill, county of Bergen, State of New Jersey, have invented certain new and useful Improvements in Camera-Shutters, of which the following is a specification.

This invention relates to improvements in camera-shutters and has especial reference to devices of this class wherein the shutter on being released by a releasing device causes the exposure by a movement in one direction only and is afterward returned to its original position by a resetting device.

My invention provides a shutter of this description which is capable of giving either instantaneous or time exposures by the action of the same resetting, actuating, and releasing devices, the change in action being effected by the shifting of a part of the releasing mechanism.

In the accompanying drawings, which form a part of this specification, Figure 1 is a front view of a shutter mechanism embodying my invention. Figs. 2 and 3 are similar views showing different positions of the shutter and portions of the releasing mechanism being broken away to show the operative parts more clearly. Fig. 4 is a detail sectional view of a portion of the releasing mechanism. Fig. 5 is a horizontal section of the releasing mechanism with the parts in the position of Fig. 3.

A represents the shutter-casing, to which the lens and diaphragm attachments are secured in the usual manner. A partition B in this casing has a central aperture $b$ and in line therewith a channel $b'$, in which slides the shutter C, having an aperture $c$. A spring D tends to move this shutter in one direction, and a lever E is provided to move the same in the opposite direction, so as to reset it. This lever is pivoted to the casing at $e$, and its outer end extends outside of the casing, so as to be accessible to the operator. The inner end of said lever E terminates in an extension $e'$, of small diameter, which passes loosely through a hole in a stud $c'$ on the sliding shutter.

A locking-lever F, pivoted at F to an extension $a$ of the casing, has a lug or detent 2, which engages with notches 3 and 7 in the side of the shutter C, and a spring S is provided which serves to draw the locking-lever F toward the shutter, so as to cause such engagement. This spring is attached to pins $s\ s'$, respectively attached to frame A and to locking-lever F, and pin $s'$ and also detent 2 work in a slot $a'$ in the frame extension $a''$. The releasing mechanism for this locking-lever comprises a sliding bolt G, whose end engages with the said lever when the bolt is projected, and thereby causes the lug $f$ to be disengaged from the shutter C. A collar H is fitted to turn around the bolt and has a handle $h$, whereby it can be rotated through an angle of about ninety degrees. This collar has a detent or pin 4, which when the collar is turned to the position shown in dotted lines in Fig. 4 is brought near the slide C, so as to be capable of engaging with a pin or stud 5 on said slide. When, however, said collar is turned to the position shown in full lines in Fig. 4, it moves the detent 4 away from the shutter, so as to be out of the path of the pin 5 thereon. The body of the bolt G carries a pin $g$, sliding in a slot $k$ in the tubular guide or casing K, wherein the bolt G slides. A connection is made by a tube L to the usual bulb M, the manipulation of which will cause the protraction and retraction of bolt G.

The operation of the device is as follows: The shutter C having been reset to the position shown in Fig. 1 and being held there by the engagement of detent 2 in locking-lever F in notch 3 of the shutter, the handle $h$ of the collar H is placed in the horizontal position shown in Fig. 1 or in the upright position shown in Fig. 2, according to whether an instantaneous or a time exposure is desired. Supposing it to be placed in a horizontal position, then the detent 4 on the collar H will be turned up out of the way of pin 5 on shutter C. If now the bolt G be thrown forward, as by pressure on the bulb, it will press the locking-lever F away from shutter C, releasing detent $f$ on said lever from engagement with notch 3 in said shutter, upon which the spring D will drive the shutter down, so as to cause the aperture $c$ therein to pass before the aperture $b$ in the partition B, thus making a so-called "instantaneous" exposure and finally coming to the position shown in dotted lines in Fig. 1. If, however, a time exposure is desired, then before releasing the shutter the handle $h$ is turned to the position shown in Figs. 2 and 3, whereby the detent 4 is turned downward toward the shutter. On now pressing the bulb the bolt will be thrown forward and will release the locking-lever F from engagement with the shutter, but will at the same time bring its detent 4 into engaging relation with the pin 5 on the shutter, so that the motion of the latter will be arrested, as shown in Fig. 2, at about midway of its course, in a position which brings the aperture $c$ in front of the aperture $b$, thus starting an exposure. When the pressure on the bulb is released, the bolt, being retracted by the suction thereof and by the pressure of the locking-lever, falls back out of the way of stud 5, and the shutter again begins to move, but is almost immediately arrested by the locking-lever F engaging by its detent 2 in the notch 7 of the shutter, as shown in Fig. 3. The opening $c$ in said shutter is somewhat elongated, as shown, so that this slight motion will still leave the aperture fully exposed. When the exposure is to be brought to an end, the bulb is again pressed and the resulting protraction of the bolt G releases the locking-lever F from engagement with notch 7, and the shutter is then driven to the end of its stroke by the spring $b$, thus covering the aperture $b$. The notches 3 and 7 and pin 5 thus constitute, in connection with the locking-lever F and stop 4, detents which are capable of arresting the motion of the shutter in three positions thereof. The stop or detent 4 is brought into and out of engaging relation with detent 5 by the sliding motion of the bolt and is adapted by the rotary or transverse motion of the collar H on the bolt to be thrown altogether out of engaging relation with the detent 5, no matter whether the bolt is thrown forward or back.

Having thus described my invention, the following is what I claim as new therein and desire to secure by Letters Patent:

1. A shutter mechanism for cameras, comprising a shutter having a plurality of detents, an actuating-spring for same, a locking device engaging detents on the shutter, a releasing device engaging with the locking device to release same from the shutter, and a detent carried by said releasing device into and out of engaging relation with a detent on the shutter and transversely movable on the releasing device to enable it to be thrown out of operative position.

2. A shutter mechanism for cameras, comprising a shutter having a plurality of detents, an actuating-spring for same, a locking device engaging detents on the shutter, a pneumatically-operated releasing device engaging with the locking device to release same from the shutter, and a detent carried by said releasing device into and out of engaging relation with a detent on the shutter and transversely movable on the releasing device to enable it to be thrown out of operative position.

3. A shutter mechanism for cameras, comprising a shutter having a plurality of detents, an actuating-spring for same, a locking-lever engaging detents on the shutter, and a releasing device consisting of a sliding bolt, engaging with said locking-lever and a part movable transversely on said bolt provided with a handle and carrying a detent movable by such transverse motion and by the sliding motion of the bolt, into and out of engaging relation with the detent on the shutter.

4. A shutter mechanism for cameras, comprising a shutter having a plurality of detents, an actuating-spring for same, a locking-lever engaging detents on the shutter, and a releasing device consisting of a sliding bolt, engaging with said locking-lever, a casing inclosing said bolt and a pneumatic operating device such as a bulb, connected to said casing and a part movable transversely on said bolt provided with a handle and carrying a detent movable by such transverse motion and by the sliding motion of the bolt, into and out of engaging relation with a detent on the shutter.

5. A shutter mechanism for cameras, comprising a shutter having a plurality of detents, an actuating-spring for same, a locking-lever engaging detents on the shutter when the latter is at the beginning and at about the middle of its course, and a releasing device consisting of a sliding bolt engaging with said locking-lever to release the shutter therefrom, means for actuating said sliding bolt, and a collar mounted to turn on and to slide with said bolt and carrying an operating-handle and a detent which by the turning of said collar can be removed from proximity to the shutter or can be brought into proximity thereto so as to engage with one of the detents thereon.

6. The combination in a camera-shutter mechanism, with the shutter $c$, having detents 3, 7 and 5 of a locking-lever F having a detent 2, sliding bolt G, collar H loosely mounted thereon, and provided with detent 4 and handle 5, substantially as and for the purpose set forth.

GEORGE C. O. LANGE.

Witnesses:
GRACE A. TAYLOR,
PERCY THORPE.